United States Patent

[11] 3,596,064

[72] Inventors Bob V. Markevitch; David K. Fibush, both of Palo Alto, Calif.
[21] Appl. No. 857,786
[22] Filed Sept. 15, 1969
[45] Patented July 27, 1971
[73] Assignee Ampex Corporation Redwood City, Calif.

[54] ELECTRONIC LINE SKEW CORRECTOR
7 Claims, 8 Drawing Figs.

[52] U.S. Cl. .......... 235/61.11
[51] Int. Cl. .......... G06k 7/016
[50] Field of Search .......... 235/61.11, 61.115, 61.115 CR, 61.111, 198; 340/146.3, 173 CRT; 250/217 CRT, 202

[56] References Cited

UNITED STATES PATENTS 2,922,049 1/1960 Sunstein .......... 235/198

*Primary Examiner*—Maynard R. Wilbur
*Assistant Examiner*—William W. Cochran, II
*Attorney*—Robert G. Clay

ABSTRACT: Circuit for obtaining a wide-band line-tracking error signal prior to the dominant time constant of the line-tracking servo. A difference circuit introduces the line-tracking error signal, which includes a skew error signal, to a synchronous detector operating at the beam zigzag rate. The error signal recovered by the detector, is indicative of skew and is used to control a variable amplitude variable polarity zigzag waveform which is, in turn, applied to the beam deflection system in a direction perpendicular to the tracked lines to thus correct for skew.

The invention described herein was made in the course of a contract with the United States Department of the Army.

INVENTOR.
DAVID K. FIBUSH,
BOB V. MARKEVITCH

BY Robert G. Clay

ATTORNEY

INVENTOR.
DAVID K. FIBUSH,
BOB V. MARKEVITCH

BY Robert G. Clay
ATTORNEY

ELECTRONIC LINE SKEW CORRECTOR

BACKGROUND OF THE INVENTION

1. Field

The present invention relates to line-tracking systems and particularly to apparatus for tracking intensity modulated lines recorded by an electron or light beam on a suitably sensitive recording medium, wherein skew is electronically corrected.

2. Prior Art

Prior line-tracking systems, such as described for example in U.S. Pat. No. 3,317,713 issued May 2, 1967 to K. F. Wallace and assigned to the same assignee as this application, must be bandwidth limited so that dirt, scratches, or other flaws in the recording medium will not cause the beam to jump to an incorrect line during the line scanning process. This bandwidth limitation prevents the use of the conventional tracking servo as a means for correcting for recording medium skew.

In order to provide accurate line tracking, the scanning system must compensate not only for recording medium and scanning beam speeds but also for skew and jump errors. These latter errors are caused by beam deflection waveforms that are not produced in exactly the right amplitude. Skew errors, of primary interest, occur when the direction of recording medium travel varies by a small part of a degree, because of mechanical tolerances or incorrect electronic settings. Jump errors, which can also be corrected by a circuit of the invention, are caused by changes in incorrect settings of the waveform during the record or playback processes.

SUMMARY OF THE INVENTION

The present invention provides circuitry for controlling the scanning beam to thereby correct for the skew errors (and/or jump errors) of previous mention. The conventional line-tracking error signal which contains information indicative of the skew error is sensed by a differencing circuit, and is introduced to a synchronous detector in synchronism with the line rate. A skew error signal in the form of a direct current (DC) signal level is recovered by the synchronous detector and is used to control a variable amplitude-variable polarity zigzag waveform generator, whose output is a triangle waveform identical to the zigzag deflection signal. Thus the invention provides means, e.g., a synchronous detector or multiplier, for detecting the amplitude and phase of the skew error. At the multiplier output of the circuit, a direct current (DC) and low frequency error component is separated from the total output via low-pass filter means and the signals are used to control the amplitude of the driving waveforms introduced to the scanning beam deflector circuits.

A separate circuit similar to that described herein for correcting for skew error may also be used to correct for the jump errors of previous mention.BRIEF DESCRIPTION OF THE DRAWING FIG. 1 is a block diagram of an embodiment of the invention.

FIGS. 2 A-E is a graph showing waveforms of skew error signals and the waveforms generated by the invention circuitry in correcting the error.

DESCRIPTION OF THE PREFERRED EMBODIMENTS

Figure 1:
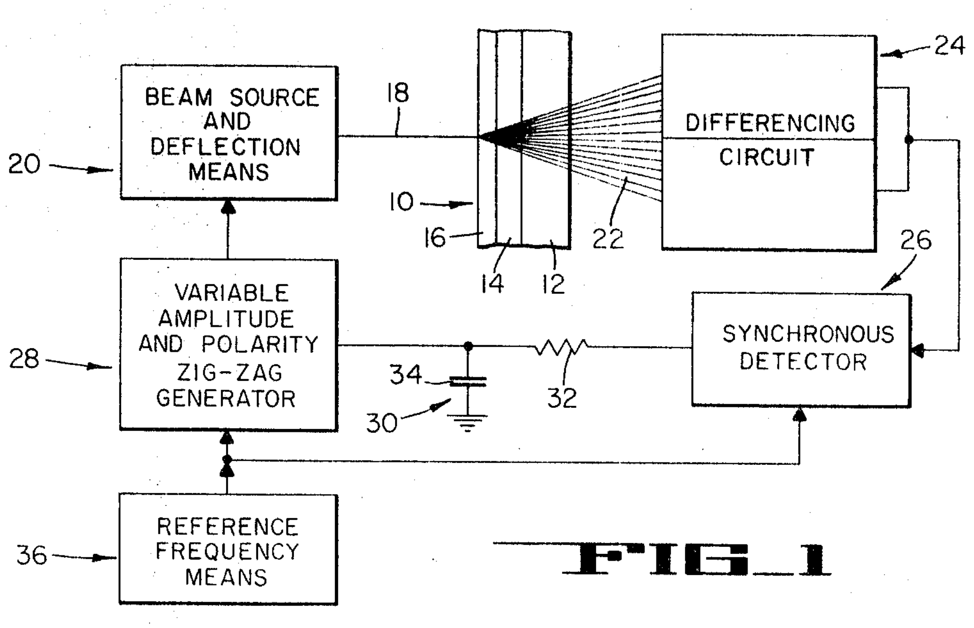

Referring to FIG. 1, a suitably sensitive recording medium 10 may be formed of a substrate 12, light or electron sensitive material 14 such as, for example, silver halide, or thermoplastic, and a scintillator material 16 disposed on the silver halide. A light beam 18 is directed at the medium 10 from a beam source and deflection means 20. The beam-scanning path is controlled by the means 20 to provide a zigzag line scan configuration across the medium width, as is generally practiced in the art and as shown in the above mentioned patents.

The beam 18 impinges the medium 10 thereby generating light radiation via the scintillator 16, the intensity of which is representative of the history recorded on the medium 10. The light is radiated from the medium generally in the form of a diverging beam 22, wherein the amount, and thus the intensity of the two halves of the beam 22 with respect to the center thereof, is proportional to the degree of variance of the beam 18 from the track center; i.e., is indicative of the accuracy with which the beam 18 is tracking recorded line. A differencing circuit 24 formed of a pair of light sensitive devices, such as described in copending U.S. Pat. application Ser. No. 691,584 filed Dec. 18, 1967 now U.S. Pat. No. 3,463,926 and assigned to the same assignee as the present application, is disposed to accept the beam 22. The differencing circuit 24 generates a line-tracking error signal having an instantaneous value of polarity and magnitude, indicative of the direction and degree of error respectively with which the scan beam 18 is tracking the line, wherein part of the line-tracking error signal is due to skew error.

The line-tracking error signal from the differencing circuit 24 is introduced to a low input impedance synchronous detector means 26. The synchronous detector means 26 may be a multiplier, or a doubly balanced demodulator circuit such as manufactured by Hewlett-Packard, Palo Alto, California, and is coupled to a variable amplitude-variable polarity zigzag generator 28 via means 30 for providing a dominant time constant for the circuit; e.g. a series resistor 32 and a capacitor 34 coupled therefrom to ground. Reference frequency generator means 36 for providing a reference frequency signal is coupled to the zigzag generator 28 and to the synchronous detector 26. The triangle waveform output from the zigzag generator 28 is introduced to the deflection circuits (not shown) of the means 20 in a direction perpendicular to the lines being tracked. The output of the generator 28 is zero in the case of zero skew error; is a given positive range of values for a "positive" skew error; and a given negative range of values for a "-negative" skew error.

Thus, the synchronous detector 26 provides a DC output which is proportional to the skew error, and which has a polarity indicative of the direction of skew. The reference frequency generator means 36 provides a square wave output voltage which is in synchronism with the beam scan rate; i.e., has a frequency of one-half the line repetition frequency. The variable amplitude-variable polarity zigzag generator 28 supplies a triangle waveform output whose amplitude is proportional to the magnitude of the skew error and whose polarity is indicative of (i.e., opposite to) the direction of skew error.

Figure 2:
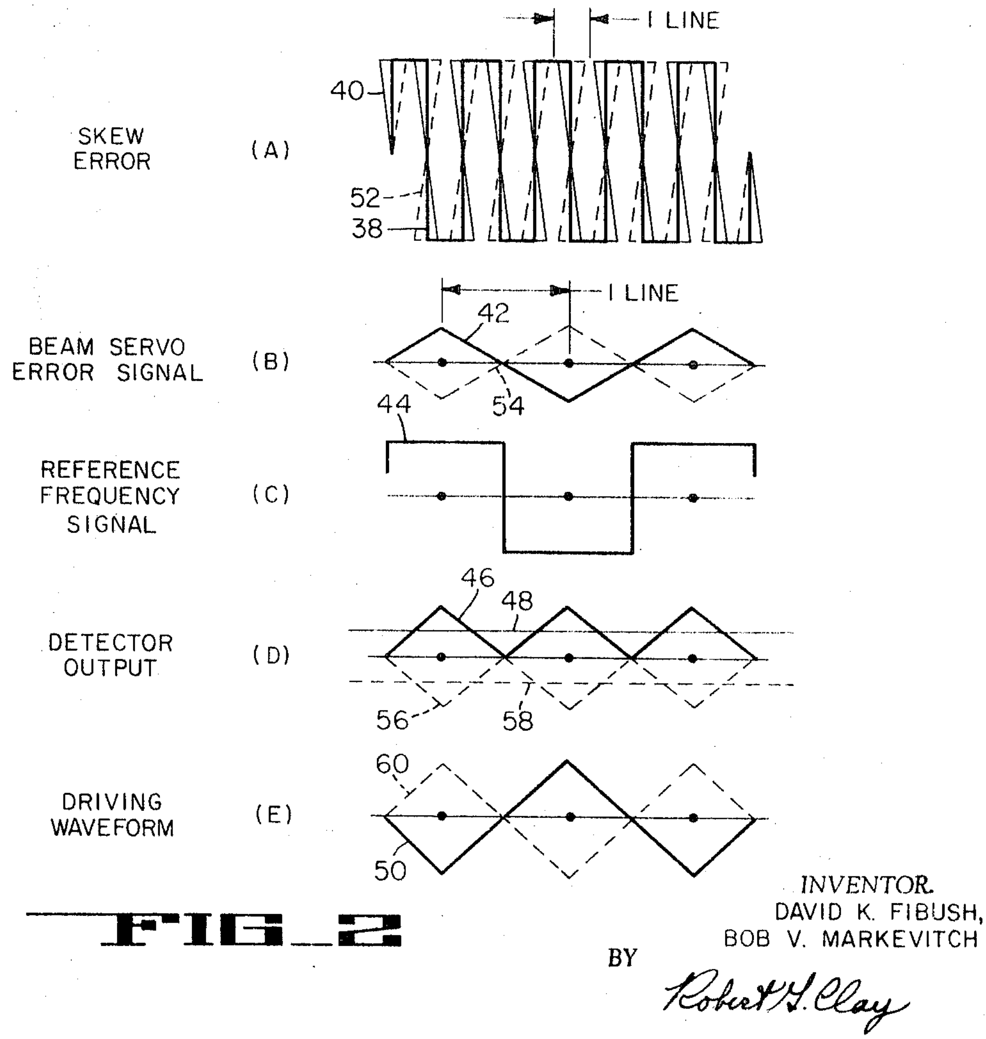

Accordingly, referring to FIG. 2 A-E, there is shown the various waveforms generated at the respective points along the invention circuitry. Given a theoretical beam line scan as depicted by the heavy, solid, zigzag line and numeral 38, and assuming a "positive" skew error to be shown by the light, solid, zigzag line 40, the beam tracking error signal delivered to the synchronous detector 26 by the differencing circuit 24, is shown in FIG. 2B as the solid zigzag line 42. The zigzag reference frequency signal introduced from the reference frequency means 36 is depicted as waveform 44 in FIG. 2C. The resulting output from the synchronous detector 26 is shown in FIG. 2D as a triangle waveform 46 whose average DC value upon filtering is a positive DC level depicted by the numeral 48. The amplitude of the DC level 48 is indicative of the magnitude of the skew error of line 40 (FIG. 2A), and the positive polarity indicates the skew to be in the "positive" direction, as defined hereinabove by way of example only. The solid line, waveform 50 of FIG. 2E depicts the output signal introduced from the variable amplitude-variable polarity zigzag generator 28 to the beam source and deflection means 20. The waveform 50 is used to provide control of the beam in a direction perpendicular to the tracking lines, with a polarity opposite to the original skew error to compensate therefor.

Given the same theoretical beam line scan depicted by numeral 38 of FIG. 2A, and assuming a "negative" skew error depicted by the dashed zigzag line 52, there are shown in FIGS. 2B—E the various waveforms generated by the components of the invention circuitry for compensating the "negative" skew error.

Thus FIG. 2B shows the dashed waveform 54 defining the beam-tracking error signal delivered to the synchronous detector 26. FIG. 2C depicts the same square waveform delivered by the reference frequency means 36. FIG. 2D depicts the resulting (negative) triangle waveform 56 generated by the synchronous detector 26. The negative DC level is represented by dashed line 58, and is proportional to the magnitude of the "negative" skew error detected by the differencing circuit 24. The resulting triangle waveform 60, generated by the variable amplitude-variable polarity zigzag generator 28 and used to correct the beam perpendicular to its direction of scan, is shown in FIG. 2E.

Figure 3:
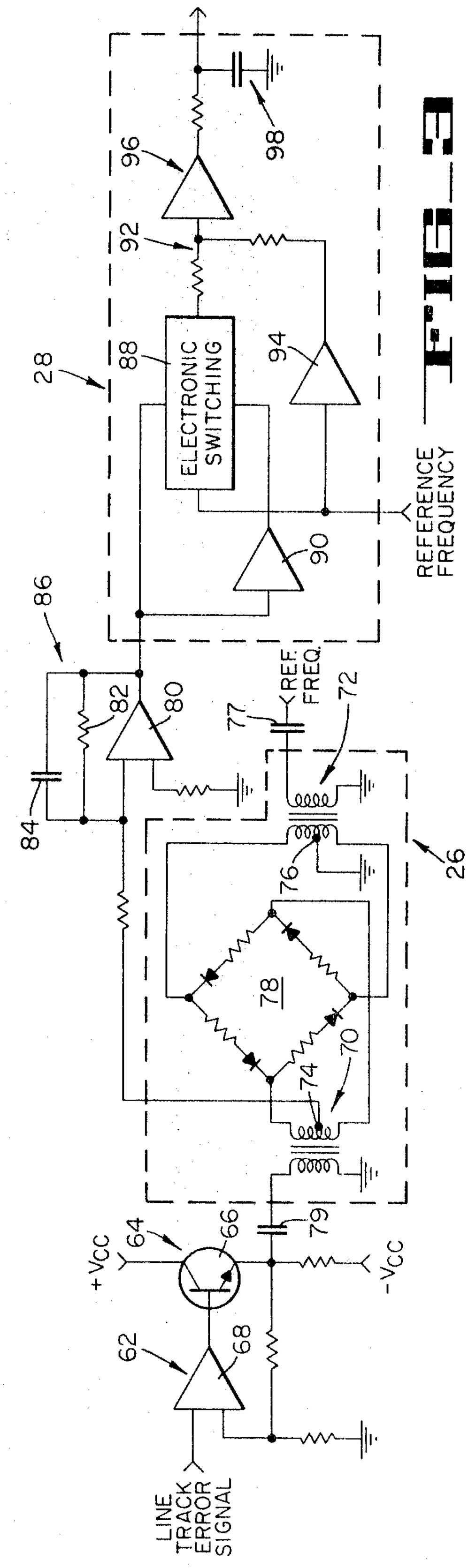
FIG. 3 is a schematic diagram showing in greater detail the circuit of FIG. 1.

Referring now to FIG. 3, the block diagram of FIG. 1 is shown in greater detail by way of example only. Accordingly, the line-tracking error signal provided by the differencing circuit 24 of FIG. 1, is introduced to the synchronous detector 26 via gain increasing means 62 and an impedance matching means 64. The synchronous detector 26 has a low input impedance and accordingly, the impedance matching means 64, employing a transistor 66, is utilized in a generally conventional manner to lower the output impedance of the prior stage to provide impedance matching with the synchronous detector 26. Likewise, since a limited amount of gain is provided by the synchronous detector 26, the gain increasing means 62 may be included in the circuit, employing an operational amplifier coupled to the impedance matching means 64.

As previously noted, the synchronous detector 26 is essentially a doubly balanced demodulator. By way of example, the synchronous detector 26 is herein shown as a pair of transformers 70, 72 having a center tap 76 connected to ground, and a center tap 74 which is the output from the synchronous detector 26. The secondary coils of the transformers 70, 72 are coupled across a bridge network 78. The reference frequency signal from the reference frequency means 36 (FIG. 1) is coupled to the primary of the transformer 72 (via a capacitor 77) while the output of the impedance matching means 64 is coupled via a capacitor 79 to the primary of the transformer 70. Thus, the synchronous detector 26 provides a DC output level (48 or 58 of FIG. 2D) whose amplitude is proportional to the magnitude of the skew error.

The signal is fed to another operational amplifier 80 which provides a further gain increase as desired. A parallel resistor 82 and capacitor 84 are coupled across the input and output of the operational amplifier 80 to provide a dominant time constant for determining the phase at the closing frequency of the circuit. Thus the phase angle is less than 180° such that the circuit will not oscillate, but instead will be stable.

The output from the operational amplifier 80 thus is a voltage signal which is proportional to the skew error with frequency constraint. This output voltage is fed to the variable amplitude-variable polarity zigzag generator 28 which is depicted in somewhat simplified block diagram in FIG. 3. The voltage proportional to the skew error is introduced as one input of an electronic switch means 88. A second input is provided to the switch means 88 from the generator 28 via an inverting amplifier 90. Thus, two voltages of opposite polarity but of the same amplitude are introduced to the electronic switch means 88 which, in turn, is triggered by an input from the reference frequency means 36 (FIG. 1). Since the signal from the reference frequency means 36 is in synchronism with the scan line rate, the electronic switch means 88 is likewise in synchronism with the line rate. The switch means 88 thus provides a square wave output which alternates between a plus and a minus voltage level, with an amplitude proportional to the skew error value, and at a rate controlled by the reference frequency signal introduced thereto. The square wave output from electronic switch means 88 is added, via a summing means 92, to a square wave signal which is 180° out-of-phase with the reference frequency signal. This 180° out-of-phase signal is provided by an inverting amplifier 94 coupled between the summing means 92 and the reference frequency means 36. The output of the summing means 92 is coupled to an operational amplifier 96 which provides for gain increases in the bipolar output signal from the summing means 92. The signal from the operational amplifier 96 is fed to an integrating network 98, whereby the square wave signal is modified to a triangle waveform similar to the zigzag driving waveform fed to the deflection circuitry portion of means 20 (FIG. 1).

Figure 4:
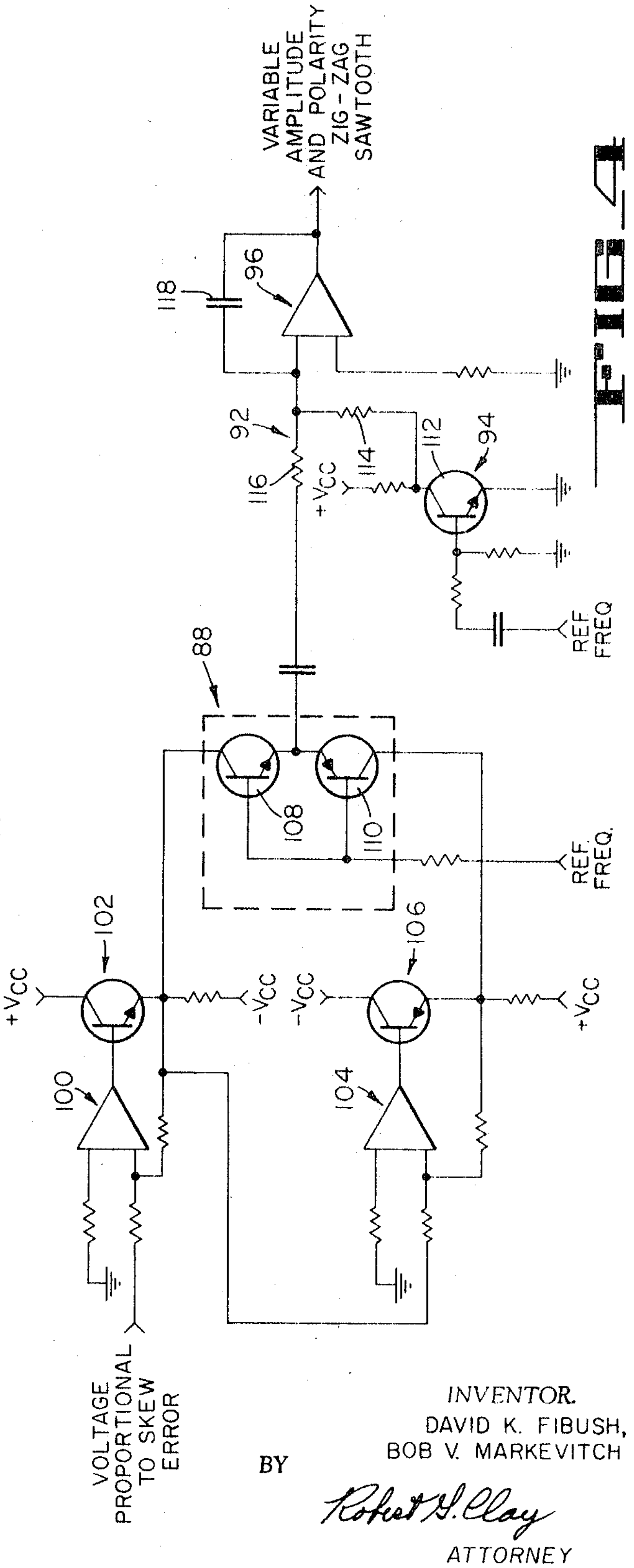
FIG. 4 is a schematic diagram showing further details of the circuit of FIG. 4.

By way of further description, FIG. 4 shows an embodiment of the variable amplitude-variable polarity zigzag generator 28 of FIGS. 1 and 3. The voltage from the synchronous detector 26, which is indicative of the skew error, is fed to an operational amplifier of a gain increasing means 100, and from thence to an impedance matching means 102. The voltage signal is also introduced to an operational amplifier of another gain increasing means 104, which inverts the signal in the manner described with reference to amplifier 90 of FIG. 3. The inverted signal is passed through impedance matching means 106. The equal magnitude but opposite polarity outputs from the impedance matching means 102 and 106 are fed to the switch means 88 which is formed of a pair of complimentary transistors 108, 110. The transistors 108 and 110 have their emitters coupled together and are driven via their bases by the reference frequency signal from the means 36 which is coupled to the bases, in synchronism with the line rate as previously described with reference to FIG. 3. Thus the output of the emitters of the switch means 88 is a variable amplitude, square wave whose amplitude is proportional to the skew error value and whose polarity is indicative of the direction of skew error.

The reference frequency signal is also introduced, with suitable delays, to the inverting amplifier 94 of FIG. 3, formed in essence of a transistor 112. The inverted, constant amplitude square wave is introduced to the output of the switch means 88 via a summing junction 92 formed of a pair of resistors 114 and 116. The output of summing junction 92 is introduced to an integrating network formed of the operational amplifier 96, and a capacitor 118 coupled across the input and output thereof. This provides an electronic integration of the incoming square wave, thereby generating an output having a variable amplitude and a variable polarity zigzag triangle waveform.

Because the two square waves applied to 114° and 116° are 180° out-of-phase with each other, when their magnitudes are equal no current is flowing into the operational amplifier 96, with the result there is no output from 96. This would occur in the zero error condition. When the magnitudes of the two square waves are not equal, the output from operational amplifier 96 is determined by the largest of the square waves; i.e., is equal to the sum, wherein the polarity is also that of the larger square wave. The output of the integrating network is introduced to the beam source and deflection means 20 FIG. 1, to thereby control the deflection of the scanning beam in a direction perpendicular to the line being tracked, and in a direction opposite the skew error.

Since the various components of the device of FIG. 1 can be implemented by various known circuits to obtain the desired function of the invention apparatus, the specific apparatus of FIGS. 3 and 4 have not been described in great detail herein. The operational amplifiers and the impedance matching means of FIGS. 3 and 4 are generally conventional and thus known by those skilled in the art. As an alternative circuit, the variable amplitude-variable polarity zigzag generator 28 shown in detail in FIG. 4, may be replaced by a four quadrant multiplier. Such a circuit would provide a bipolar output, wherein the amplitude of the resulting triangle waveform is proportional to the skew error and the polarity thereof is indicative of the direction of skew relative to the recorded line.

As previously mentioned, the same type of circuit as described hereinbefore may be utilized to correct for jump errors as well as skew errors, wherein the circuit is modified to provide an output signal having a sawtooth waveform particularly adapted to compensate for the jump errors experienced by the scanning beam.

We claim:

1. A wide-band line-tracking system for correcting for skew errors experienced in a zigzag line recording process, including beam deflector means, comprising the combination of;

circuit means for extracting a wide-band line-tracking error signal commensurate with the tracking error at the zigzag rate, which signal includes a component of skew error signal;

detector means coupled to the circuit means for recovering the skew error signal which is indicative of the degree of polarity of skew error;

waveform generating means operatively coupled to the detector means and thence to the beam deflector means to introduce a selected waveform signal to the latter means in a direction perpendicular to the lines being tracked, and, in synchronism with the zigzag line rate;

reference frequency means coupled to the detector means and the waveform generating means to provide control signals thereto for synchronously operating the detector and generating means relative to the line scan rate of the beam deflector means; and dominant time constant means coupled between the detector means and the waveform generating means to determine the phase at the closing frequency of the system.

2. The system of claim 1 wherein the detector means includes circuit means for providing a direct current output whose amplitude is representative of the magnitude of the skew error and whose polarity is indicative of the direction of skew error.

3. The system of claim 2 wherein the waveform generating means includes circuit means for providing a triangle waveform output in response to the reference frequency means, whose amplitude is proportional to the magnitude of the skew error and whose polarity is indicative of the direction of skew error.

4. The system of claim 3 wherein the reference frequency means provides a square wave output voltage which has a frequency of one-half the line repetition frequency of the zigzag line recording process.

5. The system of claim 3 wherein the circuit means for providing a triangle waveform output includes switch means operatively coupled to the detector means and responsive to the reference frequency means for providing a selected output which alternates in polarity with an amplitude proportional to the skew error and at the zigzag rate.

6. The system of claim 5 further including amplifier means operatively coupled to the detector means for increasing the gain of the direct current output, and impedance matching means operatively coupled to the amplifier means to provide impedance matching between the detector means and circuits coupled thereto.

7. The system of claim 5 wherein the waveform-generating means includes inverting amplifier means coupled to the reference frequency means to provide an inverted control signal therefrom, and summing junction means coupled to the inverting amplifier means and to the switch means to add the outputs therefrom, the output of the summing junction means being determined by the larger of the outputs from the switch means and the inverting amplifier means.